United States Patent [19]

Hess et al.

[11] 4,051,085

[45] Sept. 27, 1977

[54] HARDENABLE MOULDING COMPOSITIONS CONTAINING A THERMOPLASTIC POLYMER A COPOLYMERIZABLE VINYL COMPOUND AND A POLYESTERURETHANE

[75] Inventors: Bernhard Hess, Moers; Karl Raichle, Krefeld, both of Germany

[73] Assignee: Bayer Aktiengesellschaft, Germany

[21] Appl. No.: 621,220

[22] Filed: Oct. 9, 1975

[30] Foreign Application Priority Data

Oct. 15, 1974 Germany .............................. 2448929

[51] Int. Cl.² .................................................. C08L 1/14
[52] U.S. Cl. ........................... 260/16; 260/77.5 AN; 260/77.5 NK; 260/859 R; 260/862; 428/425; 428/426
[58] Field of Search .................... 260/859 R, 16, 862, 260/77.5 AN, 75 NK, 75 TN

[56] References Cited

U.S. PATENT DOCUMENTS

| | | | |
|---|---|---|---|
| 3,503,921 | 3/1970 | Souza, Jr. et al. | 260/862 |
| 3,642,672 | 2/1972 | Kroekel | 260/16 |
| 3,701,748 | 10/1972 | Kroekel | 260/862 |
| 3,759,873 | 9/1973 | Hudak | 260/859 |
| 3,810,863 | 5/1974 | Hatton et al. | 260/862 |
| 3,824,201 | 7/1974 | McGranaghan | 260/859 |
| 3,842,142 | 10/1974 | Harpold et al. | 260/862 |
| 3,878,137 | 4/1975 | Hess et al. | 260/16 |
| 3,882,078 | 5/1975 | Kubota | 260/862 |
| 3,940,350 | 2/1976 | Hess et al. | 260/16 |

OTHER PUBLICATIONS

Chem. Absts., vol. 70 (1969) 58601h, "Allmanna Svenska Elektriska Aktiebolag", Filled Polyester Molding Compositions.

*Primary Examiner*—Edward M. Woodberry
*Attorney, Agent, or Firm*—Connolly and Hutz

[57] ABSTRACT

Heat-hardenable moulding compositions of:
a. from 3 to 30 parts by weight of a thermoplastic polymer,
b. from 20 to 70 parts by weight of a copolymerizable vinyl compound, and
c. from 20 to 70 parts by weight of a polyesterurethane containing $\alpha,\beta$-unsaturated dicarboxylic acid radicals.

6 Claims, No Drawings

HARDENABLE MOULDING COMPOSITIONS CONTAINING A THERMOPLASTIC POLYMER A COPOLYMERIZABLE VINYL COMPOUND AND A POLYESTERURETHANE

The present invention relates to heat-hardenable moulding compositions based on a thermoplastic polymer, a copolymerisable vinyl compound and a polyesterurethane.

Heat-hardenable moulding compounds of unsaturated polyesters, copolymerisable vinyl compounds and thermoplastic ompounds are known. In such moulding compositions the thermoplastic polymer reduces shrinkage during hardening and improves the surface profile.

With such moulding compositions there is a distinction between one-component and two-component systems. A one-component system exists when the solution of the thermoplastic polymer in the vinyl compound and the solution of the unsaturated polyester in the vinyl compound are compatible with one another (for example, a solution of cellulose acetobutyrate in styrene in combination with a solution of an unsaturated polyester in styrene). A two-component system exists when the two solutions are incompatible (for example, a solution of polystyrene in styrene in combination with a solution of an unsaturated polyester in styrene, or a suspension of partially dissolved polyethylene powder in styrene in combination with a solution of an unsaturated polyester in styrene). When mixed, two-component systems generally form an unstable dispersion.

The properties of hardened shaped articles made from conventional one or two-component systems based on unsaturated polyesters are governed by the styrene compatibility of the polyester (of German Offenlegungsschrift No. 2,302,842). Styrene-incompatible polyesters in both one and two-component systems produce shaped articles with significantly lower shrinkage than styrene-compatible polyesters. Although the use of styrene-incompatible polyesters is preferred, it is subject to various disadvantages.

In the one and two-component system there is formed a distinct lining on the hardened shaped articles and in the one-component system an increased mottling which is caused by uneven pigment distribution.

By introducing urethane groups into unsaturated polyesters, unsaturated polyesterurethanes are formed with lower styrene-compatibility. It was found that moulding compositions based on such unsaturated polyesterurethanes display a particularly low shrinkage and surprisingly no surface flaws such as lining and poor color pigment distribution.

According to this invention, moulding compositions are produced which harden easily with homogeneous pigment distribution and without lining formation into shaped articles with exceptionally low shrinkage.

The invention thus provides heat-hardenable moulding compositions of:
a. from 3 to 30, preferably from 5 to 20, parts by weight of a thermoplastic polymer;
b. from 20 to 70, preferably from 30 to 60, parts by weight of a copolymerisable vinyl compound; and
c. from 20 to 70, preferably from 30 to 60, parts by weight of an unsaturated polyester-polyurethane containing $\alpha$, $\beta$-unsaturated dicarboxylic acid radicals.

The moulding compositions of the invention can be prepared by dissolving or suspending the thermoplastic polymer in the vinyl compound at a temperature of from 60° to 100° C and then, either at this temperature or after cooling to about 20° C, adding the solution of the unsaturated polyesterpolyurethane to the vinyl compound. Depending on the compatibility of the two solutions a one-component system or a two-component system is formed.

The conventional additives, such as polymerisation accelerators (e.g. peroxides), polymerisation inhibitors (e.g. hydroquinone), fillers (e.g. chalk, kaolin and, particularly, glass fibres may be added to the moulding compositions. Optionally, chemical thickening agents (e.g. magnesium or calcium oxide or hydroxide), and regulating additives (e.g. phosphoric acid semi-esters and/or water) may also be added.

Larger shaped articles are produced particularly advantageously by means of thickened resin mats. Such resin mats can be obtained by impregnating glass fibre mats with the moulding compositions of the invention, also containing a thickening agent, but free from glass fibres, protecting the surfaces of the mats with covering foils and then storing them from 1 to 10 days in order to thicken. The covering foils prevent the evaporation of the vinyl compound. After the storing period the covering foils are removed and the resin compositions (after corresponding trimming) may be hot pressed to form shaped articles.

Suitable thermoplastic polymers for use in the moulding compositions according to the present invention are:

1. Polymers

Homopolymers, copolymers and graft polymers of vinyl, vinylidene and allyl compounds, such as ethylene, propylene, isobutylene, styrene, substituted styrenes (e.g. vinyl toluene, t-butyl-styrene, chlorostyrene, divinyl benzene, $\alpha$-methyl styrene), alkyl esters, amides and nitriles of acrylic and methacrylic acids (e.g. methyl methacrylate, hydroxypropyl-methacrylate, ethyleneglycolbismethacrylate, acrylonitrile) maleic acid anhydride, neutral and acid alkyl esters of maleic and fumaric acids, vinyl esters, e.g. vinyl acetate or benzoate, adipic acid divinylester, vinyl ketones, vinyl halides, e.g. vinyl chloride, vinylidene halides, vinyl ether, allyl esters, e.g. allyl acetate, diallylphthalate, dimethallylisophthalate and allylacrylate, and allyl ethers.

In the case of graft polymerisation, suitable graft bases are, for example elastomeric polymers, such as butadiene polymers e.g. polybutadiene, butadiene-styrene-copolymers, butadiene-acrylonitrile-copolymers, isoprene polymers, e.g. 1,4-cis-polyisoprene, polyacrylic acid esters (e.g. polyethylacrylate, polybutylacrylate) ethylene-propylene-terpolymer rubbers (tercomponents e.g. hexadiene-1,5ethylidene norbornene) and polyalkenamer rubbers, e.g. trans-polypentenamers and polyoctenamers.

2. Polycondensates

Saturated polyesters, polycarbonates, polysulphones, polyamides, polyimides, alkyd resins, polysilicones, polyethers, polyxylylenes, polyacetals, aminoplasts, cyclohexanone-formaldehyde condensates and cellulose esters.

3. Polyaddition compounds

Polyurethanes, polycaprolactone, polycaprolactam, epoxy resins.

The thermoplastic polymers may also contain functional groups. Such groups are obtained by the incorporation of corresponding monomers. Those particularly preferred are thermoplastic polymers containing acid groups, e.g. sulphonic acid, phosphoric acid, phosphonic acid, or carboxyl groups, as when these are used thickened resin compositions or moulding compositions with dry surfaces are obtained which are particularly easy to process. Those particularly preferred are thermoplastic polymers containing from 0.4 to 4.0 milliequivalent of acid groups per gram of thermoplastic polymer. The preferred acid groups are carboxyl groups.

Of the types of thermoplstic polymers mentioned, the polymers are preferred. Among the polycondensates, cellulose esters, e.g. cellulose acetopropionates or butyrates, are preferred.

The molecular weight of the thermoplastic polymers may be from 500 to 10,000,000. In the case of polymers, molecular weights of from 10,000 to 500,000 are preferred and in the case of polycondensates and polyaddition compounds molecular weights of from 500 to 5,000 are preferred.

Copolymerisable vinyl compounds within the meaning of the present invention are preferably styrene, nucleus-substituted styrenes, such as vinyl toluenes, t-butyl styrenes, chlorostyrenes and divinylbenzene. These may be used alone or mixed with small quantities of acrylic or methacrylic acid or with $C_1$–$C_4$ alkyl-, vinyl-, allyl-, or methallyl-esters of acrylic or methacrylic acid.

Polyesterurethanes containing $\alpha,\beta$-unsaturated dicarboxylic acid radicals can be obtained, for example, by reaction of a low molecular weight unsaturated polyester having predominantly OH end groups with a polyisocyanate, e.g. in the melt at a temperature of about 110° C or by reaction of the components in the presence of copolymerisable vinyl monomers which are inert towards isocyanates, e.g. in styrene solution at about 70° C in the presence of the conventional inhibitors, such as benzoquinone, chloranil, hydroquinone, pyrocatechol and copper octoate in such a way that for each NCO-equivalent from 3 to 1, preferably from 1.5 to 2.5 OH and, optionally, acid equivalents are present.

Polyesters containing $\alpha,\beta$-unsaturated dicarboxylic acid radicals which are reacted with polyisocyanates to form the unsaturated polyesterurethanes of the present invention are the conventional polycondensation products of $\alpha,\beta$-unsaturated dicarboxylic acids with polyhydroxy compounds, particularly dihydroxy compounds (cf Bjorksten et al "Polyesters and their application", Reinhold Publishing Corp., New York, 1956).

Suitable $\alpha,\beta$-unsaturated dicarboxylic acids for the production of the unsaturated polyesters are, for example, maleic acid, fumaric acid, itaconic acid and optionally the anhydrides thereof; these can optionally be used as a mixture, for example, with adipic acid, phthalic acid, isophthalic acid, tetrahydrophthalic acid, terephthalic acid tetrachlorophthalic acid, hexachloroendomethylene tetrahydrophthalic acid and the anhydrides thereof. Monocarboxylic acids can also be used for the formation of the unsaturated polyesters for example acrylic acid or benzoic acid.

Suitable polyhydroxy compounds are, for example, ethylene glycol, diethylene glycol, hexamethylene-1,6-diol, propylene glycol-1,2 dipropylene glycol, butane diol-1,3, neopentylglycol, trimethylolpropane diallylether, 2,2-bis-(4hydroxycyclohexyl)-propane, 2,2-bis-(4-hydroxyalkoxy-phenyl)-propane, trimethylolpropane, glycerin and pentaerythritol. Optionally, monohydroxy compounds such as benzyl alcohol, cyclohexanol, allyl alcohol, methanol or ethanol may also be used for the formation of the unsaturated polyesters.

In the production of unsaturated polyesters an excess of polyhydroxy- compounds is used, so that OH numbers $> 80$, preferably from 100 to 250, and acid numbers of from 10 to 60, preferably from 20 to 50, are obtained. This corresponds to molecular weights of less than 1240, preferably from 370 to 930, if these are calculated from the sum of the acid and OH number according to the following formula:

$$(112 \times 1000/A) = \text{molecular weight Acid number} + \text{OH number} = A \text{ [mg KOH/g]}.$$

The content of $\alpha,\beta$-unsaturated dicarboxylic acids of the unsaturated polyester can vary widely. Since the shaped articles produced from the unsaturated polyesterurethanes of the invention are in practice removed from the mould while still hot, and consequently must display adequate heat-stability, a high content of $\alpha,\beta$-unsaturated dicarboxylic acids of from about 0.65 to 0.20 mols/100 g of unsaturated polyester is preferred.

Suitable polyisocyanates, which are reacted with the unsaturated polyesters to form the unsaturated polyester urethanes according to the present invention, are aliphatic, cycloaliphatic and aromatic polyisocyanates, e.g. 1,6-hexamethylene diisocyanate, 4,4'-dicyclohexylmethane diisocyanate, 1-methyl-cyclohexane-2,4-and 2,6-diisocyanate and mixtures of these isomers, 2,4-and 2,6-tolyene diisocyanate and mixtures of these isomers, naphthylene-1,5-diisocyanate, 4,4'-diphenylmethanediisocyanate, xylylene-1,3- and 1,4-diisocyanate, higher molecular weight polyisocyanates such as may be obtained from compounds having polyisocyanate and hydroxyl groups, e.g. in accordance with German Pat. Nos. 870,400 and 909,186, also 4,4'-triphenylmethanetriisocyanate and polyarylpolyalkylenepolyisocyanates, such as may be obtained by aniline-aldehyde-(e.g.formaldehyde) condensation and subsequent phosgenation, or di- or tri-merised tolylene diisocyanate.

Of the polyisocyanates mentioned, diisocyanates are preferred, or polyisocyanates whose functionality has been reduced to two by reaction with monohydric alcohols.

It is also possible to use in proportion monoisocyanates, e.g. phenylisocyanate and/or polyisocyanates reacted with monohydric alcohols, which after reaction still contain at least one NCO group per molecule; this is particularly advantageous as in this way polyesterurethanes having a lower viscosity in vinyl monomer solutions are obtained, which offer technical processing advantages, e.g. good wetting of fillers and fibrous substances and the possibility of being able to incorporate a higher proportion of filler, which is advantageous in terms of price, and of allowing a higher proportion of fibres, which means greater mechanical strength for the formed part.

The polyesterurethanes used according to the present invention have a urethane group content of at least 0.05, preferably at least 0.1, urethane group equivalents per 100 g of polyesterurethane.

The styrene-compatibility of styrene-solubility of unsaturated polyesters is a concept which is known in the chemistry of unsaturated polyester resins, of Johannes Scheiber, "Chemie and Technologie der kunstlichen Harze", volume 1, "Die Polymerisatharze", Wissenschaftliche Verlagsgesellschaft MBH, Stuttgart, 1961, 2nd edition, pp. 563 et seq., particularly pages 566 and 571/572.

The "styrene-compatibility" of an unsaturated polyester-urethane and of other unsaturated polyesters is expressed as percent by weight of unsaturated polyester(urethane) based on the total weight of unsaturated polyester(urethane) and styrene. Styrene compatibility is measured as follows:

Just enough unsaturated polyester(urethane) is dissolved in styrene at a temperature of from about 80° to 100° C, so that, after immediate cooling to room temperature, a clear solution of known concentration is obtained. While being stirred at room temperature, this is mixed with further styrene until the solution begins to cloud. The percentage by weight based on the total quantity of styrene and unsaturated polyester(urethane) of the unsaturated polyester(urethane) in this mixture at the point of clouding is defined as the styrene-compatibility.

The recognition of the clouding point is facilitated by the use of a black background during dilution with styrene. The styrene used preferably contains sufficient quantities of an inhibitor, e.g. 0.2% t-butyl-pyrocatechol, in order to prevent clouding by other causes (e.g. polystyrene present) which might falsify determination.

The mixtures according to the present invention contain conventional polymerisation inhibitors in conventional quantities which prevent premature, uncontrolled gelling, for example, hydroquinone, toluhydroquinone, p-benzoquinone, p-t-butyl pyrocatechol, chloranil, naphthoquinone, copper compounds or p-nitrosodimethylaniline.

Suitable radical-forming initiators are, for example, benzoyl peroxide, t-butyl perbenzoate, t-butyl peroxide, cyclohexanoneperoxide, t-butyl peroctoate, azoisobutyrodinitrile and cumenehydroperoxide.

Conventional chemical thickeners include the oxides and hydroxides of the metals of Group II a of the Periodic Table of the Elements (Handbook of Chemistry and Physics, 47th Edition (1966) Page B-3; Chemical Rubber Comp., Cleveland, Ohio), preferably the oxides and hydroxides of magnesium and calcium.

Additives which accelerate or regulate chemical thickening are, for example, water or additives according to DT-OS No. 1,544,891, e.g. aliphatic carboxylic acids and phosphoric acid semi-esters.

Suitable conventional thixotropising agents are, e.g. inorganic ones, such as aerosil, or organic ones containing acid amide or urethane groups, or cyclohexylamides of higher fatty acids (DAS Nos 1,182,816 and 1,217,611 and Belgian Patent No. 693,580).

The conventional additives are inert inorganic fillers, such as calcium carbonate, silicates, clays, lime, carbon, strengthening fibres, such as glass fibres, also in the form of fabric or mats, synthetic organic fibres, cotton, asbestos or metal fabric, organic or inorganic pigments, dyestuffs, lubricants and parting compounds, such as zinc stearate and UV absorbers.

The mixing of the three-component mixtures according to the present invention with polymerisation inhibitors, radical-forming agents, chemical thickeners, thixotropising agents and the conventional additives takes place in kneaders, dissolvers or on a roller frame or in the case of small-scale tests in a mortar for the purpose of the production of the heat-hardenable pressing or moulding composition according to the present invention.

Instead of, or in addition to, glass fibres, glass fibre mats or glass fibre fabric may be used for the production of the heat-hardenable pressing or moulding compounds according to the present invention as mentioned above. In this case the glass fibres are impregnated with the moulding composition to be hardened, followed by from 1 to 10 days storage in sealed containers, e.g. using covering layers.

The moulding or pressing compositions containing chemical thickeners according to the present invention harden under a pressure of from 20 to 140 kp/cm$^2$ at a temperature of from 120° to 160° C depending on size and shape, for from 0.5 to 5 minutes, thus producing lining-free shaped articles with homogeneous pigmentation and minimal shrinkage.

The following Examples illustrate the invention

EXAMPLES

Percentage figures are calculated n a weight basis. Viscosity figures are measurements in the falling sphere viscosimeter according to Hoppler at 20° C.

PRODUCTION OF UNSATURATED POLYESTERS

The unsaturated polyesters are produced in conventional manner by melt condensation and dissolved to give 65% solutions in styrene containing benzoquinone. Before dissolving, hydroquinone is added to the polyester. The composition of the low molecular weight polyester UP 1 — the preliminary stage of the polyurethane UPU 1 — and the two comparison polyesters and the characteristic figures of the solutions are given in Table I.

Table I

| Description: | Preliminary stage UP 1 | *VP1 | Comparison VP 2 |
|---|---|---|---|
| Maleic acid anhydride (g) | 980 | 774 | 735 |
| Phthalic acid anhydride (g) | — | 311 | 370 |
| Propylene glycol-1,2 (g) | 988 | 418 | 836 |
| Ethylene glycol (g) | — | 341 | — |
| Hydroquinone (g) | 0.36 | 0.33 | 0.35 |
| Benzoquinone (g) | 0.18 | 0.17 | 0.17 |
| Characteristic figures of polyester | | | |
| Acid number (mgKOH/g) | 38 | 32 | 32 |
| OH number (mgKOH/g) | 187 | 53 | 50 |
| Styrene compatibility (%) | 29 | 56 | 10 |
| Molar weight (calculated from SZ + OHZ) | 498 | 1320 | 1360 |
| Characteristic figures of styrene solution | | | |
| Solids content (%) | 65 | 65 | 65 |
| Viscosity (cP) | 240 | 2800 | 2300 |

The styrene compatibility is determined as described on pages 8 and 9.

PRODUCTION OF UNSATURATED POLYESTERURETHANE

The solution of the low molecular weight preliminary stage polyester UP 1 is reacted to the polyester urethane UPU 1 as follows.

In a 2 liter three-necked flask with stirrer and thermometer, 1538 g of UP 1 solution — consisting of 1000 g of polyester UP 1 and 538 g of styrene — are mixed at room temperature with 174 g of 2,4-tolylene diisocyanate and 94 g of styrene, the solution is heated to 75° C and maintained at this temperature for 2 hours. It is then cooled to room temperature.

Table II

| Composition of solution UPU 1 | | |
|---|---|---|
| UP 1 (100%) | 1000 g | containing 4.0 eq. (OH+COOH) |
| Styrene | 632 g | — |
| 2,4-tolylene diisocyanate: | 174 g | containing 2.0 eq. NCO |
| eq. NCO: eq. (OH+COOH) | | 1:2 |
| eq. urethane groups / 100 g UPU 1 (100%) | | 0.17 |
| Characteristic figures of solution UPU 1 | | |
| Solids content | 65 % | |
| Styrene compatibility | 56 % | |
| Viscosity (20° C) | 10,000 cP | |

The production of a low viscosity polyesterurethane UPU 2 takes place as follows:

In a 2 liter four-necked flask with stirrer, dropping funnel and thermometer 20 g isopropyl alcohol are added dropwise to 174 g 2,4-tolylenediisocyanate under nitrogen over a period of 20 mins., and a maximum temperature of 50° C is maintained by cooling. The mixture is stirred for a further 15 minutes after the addition without cooling and is then cooled to room temperature. 1538 g UP 1 solution — consisting of 1000 g polyester UP 1 and 538 g styrene — and 105 g styrene are added at room temperature to the adduct produced and the mixture is heated to 75° C. After 2 hours at this temperature it is cooled to room temperature.

Table III

| Composition of solution UPU 2: | | |
|---|---|---|
| UP 1 (100%) | 1000 g | containing 4.0 eq. (OH+COOH) |
| Styrene | 643 g | |
| 2,4 tolylenediisocyanate | 174 g | containing 2.00 eq. NCO |
| Isopropanol | 20 g | containing 0.3 eq. OH |
| Eq. NCO: eq. (OH+COOH) | | 1 : 2.17 |
| Eq. urethane groups/100 g UPU 100%) | | 0.17 |
| Characteristic figures of solution UPU 2: | | |
| Solids content | 65% | |
| Styrene compatibility | 53% | |
| Viscosity (20° C) | 3250 cP | |

PRODUCTION OF THE COMPOSITIONS ACCORDING TO THE PRESENT INVENTION:

Since the styrene solutions UPU 1 and UPU 2 only thicken very slowly with MgO, in each case 0.3 parts, by weight, per 100 parts, by weight, of phosphoric acid mono-n-butylester are added to accelerate thickening.

60 parts, by weight, of each of the solutions according to the present invention and of the comparative polyester solutions VP 1 and VP 2 are in each case mixed with 40 parts, by weight, of the styrene solution of a thermoplastic polymer, produced at 80° C and containing 12 parts, by weight, of a thermoplastic polymer, at room temperature, and either clear solutions (1-component systems) or dispersions (2-component systems) are obtained.

Table IV

| Composition of the mixtures | |
|---|---|
| 60 parts, by weight, of UPU or comparative solution consisting of: | 39 parts, by weight, of UPU or VP |
| | 21 parts, by weight, of styrene |
| 40 parts, by weight, of thermoplastic polymer in styrene consisting of: | 12 parts, by weight, of thpl. polymer |
| | 28 parts, by weight, of styrene |
| | 100 parts, by weight |
| 100 parts, by weight, mixture | |

The thermoplastic polymers used and the designation of the mixtures produced with them in the described manner are compiled in Table V.

Table V

| Examples[1] | Polyesterurethane and comparative polyester | Thermoplastic polymer | Comp. (number) |
|---|---|---|---|
| 1 | UPU 1 | Cellulose aceto-butyrate[2] | 1 |
| 1a | VP 1 | Cellulose aceto-butyrate | 1 |
| 1b | VP 2 | Cellulose aceto-butyrate | 1 |
| 2 | UPU 1 | neutral polystyrene[3] | 2 |
| 2a | VP 1 | neutral polystyrene | 2 |
| 2b | VP 2 | neutral polystyrene | 2 |
| 3 | UPU 1 | acid polystyrene[4] | 2 |
| 3a | VP 1 | acid polystyrene | 2 |
| 3b | VP 2 | acid polystyrene | 2 |
| 4 | UPU 2 | acid polystyrene[4] | 2 |

[1]The Examples designated with letters are comparison Examples.
[2]Cellulose acetate butyrate with 18%, by weight, acetic acid and 45 %, by weight butyric acid content and a viscosity according to ASTM-D 871-56, formula B, equivalent to 0.3 sec.
[3]Neutral polystyrene (Vestyron 114-30/CWH), viscosity of the 30 % styrene solution: 4100 cP.
[4]Acid polystyrene: copolymer of 1%, by weight, acrylic acid and 99%, by weight, styrene. Viscosity of styrene solution 30 %: 890 cP.

The evaluation of the compositions according to the present invention is carried out in each case on a hardened pressed part in the form of a tray 27 × 36 cm with a wall thickness of approx. 1 mm, which is produced from a thickened resin mat and by means of the measurement of the relative shrinkage during hardening of the same glass fibre-free, thickened resin mat composition.

PRODUCTION OF THE RESIN MAT

In each case, 200 g of the compositions according to the Examples and comparative Examples 1 to 4 are homogeneously mixed with a dissolver with the admixture listed below; a fibre glass mat is impregnated with the composition in the specified quantity ratio; the mat with covering layers, protected on both sides, is rolled up and stored for 7 days at room temperature.

Table VI

| Composition of resin mats | |
|---|---|
| g | |
| 200.0 | composition according to Examples and comparison Examples |
| 200.0 | calcium carbonate |
| 4.0 | magnesium oxide |
| 8.0 | zinc stearate |
| 3.3 | black iron oxide |
| 6.7 | red iron oxide |
| 1.5 | t-butyl perbenzoate |
| 60.0 | fibre glass mat |

PRODUCTION OF PRESSED PARTS

After the mats have been stored for 7 days at room temperature the covering layers are removed, which with the mats containing acid polystyrene may be done particularly easily and without any damage to the mats, since they have absolutely dry surfaces. The mats are cut to 24 × 36 cm rectangles and in each case two superimposed sections are pressed into a tray in 3 mins. at a temperature of 145° C and a pressure of 100 kp/cm². The evaluation of the tray is given in Table VII.

MEASUREMENT OF SHRINKAGE

The evaluation of the shrinkage of the hardened compositions according to the Examples and comparison Examples is carried out in each case by using a fibre glass-free, thickened resin mat composition, since glass fibres as described below, influence the shrinkage by virtue of their orientation. The compositions are stored at room temperature in sealed barrels (from 1 to 10 days) until they have attained a viscosity of 10 million cP and are then pressed at a pressure of 12 g in a heatable laboratory press detailed description in Kunststoff Rundschau 1972, (H 11), pp. 592–597 — into cylindrical pressed parts with a diameter of 20 mm and a height of approx. 25mm. The material is poured in at 30° C, then the mould is heated under in each case constant pressure of 25 and 50 kp/cm² to 140° C and by means of a thermocouple element the internal temperature of the pressed part is recorded; similarly, the movement of the piston applying pressure is recorded over the time-duration by means of an inductive displacement pick-up. After the fading of the exothermic reaction (7 mins) the mould is cooled to 30° C. The displacement and temperature curves obtained are schematically as follows:

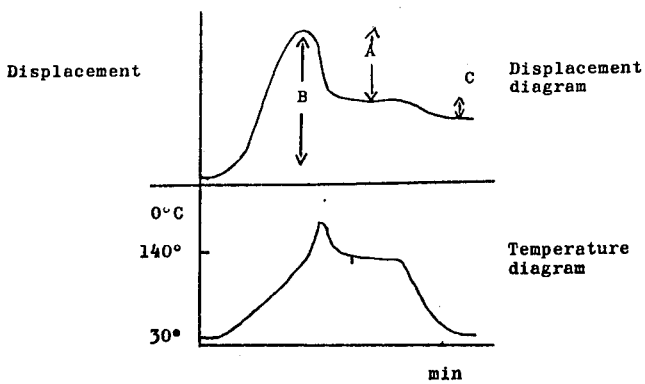

In the volume diagram, distances A and B are the determinant, greatly differing dimensions. Connected by the following formula, they provide a definition of the relative shrinkage S (rel.).

$$S (rel) = A \cdot 100/B$$

wherein A and B are measured in mm.

Dimension C is approximately equal for all tests and so is ignored. Since the type and quantity of the compositions are kept constant for all tests, S (rel) is directly related to the compositions according to the present invention.

The relative shrinkage values determined in this way from the Examples and the comparison Examples are compiled in Table VII.

The percentage figures in Table VII relating to coating are estimated and give the proportion of the coated area in relation to the total area.

Table VII clearly shows that moulded parts with minimal shrinkage and homogeneously coloured coating-free surfaces are only attainable with compositions of Examples 1 to 4 according to the present invention.

Table VII

| Examples and comparison Examples | Tray Coating on: Press | Tray | Colouring | Pressed part rel. shrinkage at 25 kp/cm² | 50 kp/cm² |
|---|---|---|---|---|---|
| 1-component systems with cellulose aceto-butyrate | | | | | |
| 1 | 0 % | 0 % | homogeneous | 38 % | 79 % |
| 1a | 5 % | 5 % | heavily veined | 38 % | 78 % |
| 1b | 0 % | 0 % | homogeneous | 84 % | 145 % |
| 2-component systems with neutral polystyrene | | | | | |
| 2 | 0 % | 0 % | homogeneous | 24 % | 49 % |
| 2a | 80 % | 100 % | homogeneous | 25 % | 51 % |
| 2b | 0 % | 0 % | homogeneous | 40 % | 60 % |
| 2-component systems with acid polystyrene | | | | | |
| 3 | 0 % | 0 % | homogeneous | 30 % | 52 % |
| 3a | 40 % | 100 % | homogeneous | 35 % | 55 % |
| 3b | 5 % | 5 % | homogeneous | 40 % | 80 % |
| 4 | 0 % | 0 % | homogeneous | 20 % | 52 % |

We claim:
1. A heat hardenable moulding composition which is a blend of preformed ingredients comprising
    a. from 3 to 30 parts by weight of a thermoplastic polymer having a molecular weight of 500 to 10,000,000,
    b. from 20 to 70 parts by weight of a copolymerizable vinyl compound,
    c. from 20 to 70 parts by weight of a polyesterurethane having α, β-ethylenically unsaturated dicarboxylic acid residues and a urethane group equivalent of at least 0.05 equivalents per 100 g. of polyesterurethane and
    d. a viscosity-increasing amount of a member selected from the group consisting of oxides and hydroxides of the metals of Group IIa of the Periodic Table.
2. A moulding composition according to claim 1, characterised in that the thermoplastic polymer is polystyrene or cellulose aceto-butyrate.
3. A moulding composition according to claim 1, characterised in that the copolymerisable vinyl monomer is styrene.
4. A moulding composition according to claim 1, characterised in that the unsaturated polyesterurethanes have a urethane group content of at least 0.1 urethane group equivalents per 100 g of polyesterurethane.
5. A moulding composition according to claim 1, characterized in that the unsaturated polyesterurethanes have been produced from oligomeric polyesters contaning α,β-unsaturated dicarboxylic acid radicals, having a molecular weight of less than 1,240 by reaction with polyisocyanates.
6. A moulding composition according to claim 1, characterised in that the unsaturated polyesterpolyurethane contains incorporated within it monofunctional isocyanate.

* * * * *